(12) United States Patent
Tokumoto

(10) Patent No.: US 6,847,876 B2
(45) Date of Patent: Jan. 25, 2005

(54) ELECTRIC POWER STEERING APPARATUS

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 147 days.

(21) Appl. No.: 10/231,203

(22) Filed: Aug. 30, 2002

(65) Prior Publication Data

US 2003/0102181 A1 Jun. 5, 2003

(30) Foreign Application Priority Data

Nov. 30, 2001 (JP) .......................................... 2001-367876

(51) Int. Cl.⁷ .............................................. B62D 5/04
(52) U.S. Cl. ...................... 701/41; 180/443; 180/446
(58) Field of Search ............................. 701/41, 42, 43; 180/443, 446

(56) References Cited

U.S. PATENT DOCUMENTS

| | | | | |
|---|---|---|---|---|
| 4,582,155 A | * | 4/1986 | Ohe | 180/444 |
| 5,448,482 A | * | 9/1995 | Yamamoto et al. | 701/41 |
| 6,018,691 A | * | 1/2000 | Yamamoto et al. | 701/41 |
| 6,148,949 A | * | 11/2000 | Kobayashi et al. | 180/446 |
| 6,363,797 B1 | * | 4/2002 | Tokumoto | 73/862.328 |
| 6,543,571 B2 | * | 4/2003 | Tokumoto | 180/446 |
| 6,691,820 B2 | * | 2/2004 | Tokumoto | 180/446 |

FOREIGN PATENT DOCUMENTS

| | | |
|---|---|---|
| EP | 1 127 775 A1 | 8/2001 |
| EP | 1 138 577 A2 | 10/2001 |
| EP | 1 174 328 A1 | 1/2002 |
| JP | 10-258756 | 9/1998 |
| JP | 2000-352502 | 12/2000 |
| JP | 2002-29431 | 10/2002 |

* cited by examiner

Primary Examiner—Gary Chin
(74) Attorney, Agent, or Firm—Birch, Stewart, Kolasch & Birch, LLP

(57) ABSTRACT

An electric power steering apparatus for detecting the rotational angles of a steering shaft, which connects the steering wheel of a vehicle and the steering mechanism, at different positions in the axial direction of the steering shaft, calculating torque applied to the steering shaft based on the difference between the detected rotational angles, and driving and controlling a steering force assisting motor according to the direction and magnitude of the calculated torque. The angular velocities of the steering shaft at the respective detection positions are calculated based on the rotational angles. Based on the relation between the calculated angular velocities, a judgment is made as to whether the torque was caused by an input from the steering wheel side or an input from the steering mechanism side. Based on the result of the judgment, the motor is driven and controlled.

7 Claims, 8 Drawing Sheets

ELECTRIC POWER STEERING APPARATUS

BACKGROUND OF THE INVENTION

The present invention relates to an electric power steering apparatus that detects torque applied to a steering shaft of a vehicle for steering operation, and drives and controls a steering force assisting motor based on the detected torque.

An electric power steering apparatus, which assists steering by driving a steering force assisting motor based on the detection result of torque applied to the steering wheel for steering operation and transmitting a turning force from the motor to the steering mechanism, has the advantage of more easily controlling the assisting force characteristics according to a running state such as the vehicle speed and the frequency of steering, compared to a hydraulic power steering apparatus using a hydraulic actuator as the source of the steering assisting force. In recent years, the range of its application is being expanded.

Such an electric power steering apparatus needs to detect steering torque applied to the steering wheel. In general, the detection is accomplished by detecting rotational angles at two positions distant in the axial direction of the steering shaft connecting the steering wheel and the steering mechanism. In other words, since the steering shaft has torsion due to the action of the torque applied to the steering wheel during the steering operation and the torsion corresponds to the difference between the rotational angles detected at the two positions, it is possible to calculate the torque based on this difference.

The steering shaft is constructed by connecting an input shaft on the steering wheel side and an output shaft on the steering mechanism side through a torsion bar of a small diameter so that a large rotational angle difference is produced between the input shaft and the output shaft with the torsion of the torsion bar. By detecting the rotational angles at the connection parts of the input shaft and output shaft, the calculation accuracy of the torque can be improved.

The applicant of this application proposed, in Japanese Patent Application Laid-Open No. 2000-352502, etc., a torque detecting apparatus suitable for detecting torque in an electric power steering apparatus. This torque detecting apparatus has sensor units provided respectively at the connection parts of the input shaft and output shaft. The sensor units comprise magnetic targets which are provided in a circumferential direction of an object rotational axis and tilted approximately equally with respect to the axial direction; and magnetic sensors (MR sensors) which are provided outside the magnetic targets to face the same and generate outputs varying with the passage of the targets.

In this construction, the magnetic sensor in each of the sensor units outputs a voltage that changes linearly with an inclination corresponding to the tilt of the targets arranged on the circumference of the input shaft and output shaft as each target passes by. Accordingly, the rotational angles of the input shaft and output shaft can be detected in a non-contact manner based on the output voltages from the corresponding magnetic sensors, and the steering torque applied to the input shaft with the operation of the steering wheel is calculated based on the difference between the rotational angles of the input shaft and output shaft, which is given as the difference between the outputs of the magnetic sensors corresponding to the input shaft and the output shaft.

By the way, for the control of the steering force assisting motor in the electric power steering apparatus, it is necessary to detect the magnitude of the torque applied to the steering wheel and also the direction of the torque, namely, whether the steering is performed to the left or right direction. The torque detecting apparatus constructed as described above compares the rotational angle of the input shaft and that of the output shaft, and judges that the torque is applied in the direction in which the input shaft precedes the output shaft.

In addition to the proper input torque (steering torque) applied from the input shaft on the steering wheel side according to the steering operation, a reaction force from the road surface applied to steered wheels acts on the steering shaft of a running vehicle as an input torque from the output shaft on the steering mechanism side (hereinafter referred to as the "inverse input torque"). For example, during straight driving without turning the steering wheel, if the vehicle runs on a rough road surface and large inverse input torque is applied, the inverse input torque may be detected by the torque detecting apparatus constructed as described above.

However, the inverse input torque as described above is applied such that the rotation of the output shaft side precedes that of the input shaft side, while the proper steering torque is applied such that the rotation of the input shaft side precedes that of the output shaft side. Consequently, in judging the torque direction based on the detection result by the torque detecting apparatus, the inverse input torque is judged to be steering torque applied in the direction in which the steering wheel is energized by the action of the reaction force from the road surface, which is a cause of the inverse input torque. When the steering force assisting motor is driven according to the torque detection, a driving force of the motor is applied to the steering mechanism in the same direction as the inverse input torque, and the driver feels such that the primary inverse input torque is promoted. The conventional art thus has a problem of causing a deterioration of steering feeling.

As a technique related to such a problem, the applicant of the present invention proposed, in Japanese Patent Application Laid-Open No. 2002-29431, "an electric power steering apparatus" comprising means for detecting rotational angles of a steering shaft, which connects a steering mechanism and a steering wheel of a vehicle, at different positions in the axial direction of the steering shaft and calculating the angular velocities of the steering shaft at the respective positions based on the detection results; a speed sensor for detecting the running speed of the vehicle; and control means for reversing the driving direction of a motor, which is determined by the result of calculating steering torque, when a predetermined correlation is established between the calculated angular acceleration and the detected vehicle speed.

Moreover, the applicant of the present application proposed, in Japanese Patent Application Laid-Open No. 10-258756(1998), "a steering apparatus for a vehicle" that is capable of switching a steering mode between an automatic steering mode in which an actuator generates a steering force based on an instruction signal from a control unit and a normal steering mode in which a driver generates a steering force, comprises: means for calculating values corresponding to the rotational angle on the steering wheel side of the steering shaft in a time series; and means for calculating values corresponding to the rotational angle on the wheel side of the steering shaft in a time series, judges that the applied steering force was applied by the driver, if a change in the rotational angle on the steering wheel side precedes a change in the rotational angle on the wheel side, judges that the applied steering force was applied to the vehicle from the outside, if a change in the rotational angle on the wheel side precedes a change in the rotational angle on the steering wheel side, and switches to the normal steering mode from the automatic steering mode when the value corresponding to the applied steering force is equal to or higher than a preset value.

BRIEF SUMMARY OF THE INVENTION

An object of the present invention is to provide an electric power steering apparatus capable of judging whether torque was caused by an input from the steering wheel side or an input from the steering mechanism side and of driving and controlling a steering force assisting motor based on the result of the judgment.

Another object of the present invention is to provide an electric power steering apparatus capable of judging the running state of a vehicle in greater detail and of driving and controlling the steering force assisting motor based on the judged running state.

An electric power steering apparatus according to the first aspect is an electric power steering apparatus for detecting rotational angles of a steering shaft, which connects a steering wheel of a vehicle and a steering mechanism of wheels, at different positions in an axial direction of the steering shaft, calculating torque applied to the steering shaft, based on a difference between the detected rotational angles, and driving and controlling a steering force assisting motor attached to the steering mechanism so as to apply an assisting force corresponding to a direction and magnitude of the calculated torque to the steering mechanism, wherein the electric power steering apparatus comprises: calculating means for calculating an angular velocity or angular acceleration of the steering shaft at each of the detection positions, based on the detected rotational angles; and judging means for judging whether the torque is caused by an input from the steering wheel side or an input from the steering mechanism side, based on a relation between the angular velocities or a relation between angular accelerations calculated by the calculating means, and the motor is driven and controlled based on a result of judgment by the judging means.

In the electric power steering apparatus of the first aspect, the rotational angles of the steering shaft which connects the steering wheel of the vehicle and the steering mechanism of the wheels are detected at different positions in an axial direction of the steering shaft, torque applied to the steering shaft is calculated based on the difference between the detected rotational angles, and the steering force assisting motor attached to the steering mechanism is driven and controlled so as to apply an assisting force corresponding to the direction and magnitude of the calculated torque to the steering mechanism. The calculating means calculates the angular velocity or angular acceleration of the steering shaft at each of the detection positions, based on the detected rotational angles, the judging means judges whether the torque is caused by an input from the steering wheel side or an input from the steering mechanism side, based on the relation between the angular velocities or the relation between angular accelerations calculated by the calculating means, and the motor is driven and controlled based on a result of the judgment by the judging means.

Thus, it is possible to realize an electric power steering apparatus capable of judging whether the torque was caused by an input from the steering wheel side or an input from the steering mechanism side and of driving and controlling the steering force assisting motor based on the result of the judgment.

An electric power steering apparatus according to the second aspect is based on the first aspect and further comprises speed-related value detecting means for detecting a value relating to a running speed of the vehicle, wherein the judging means judges a running state of the vehicle, based on the relation between the angular velocities or the relation between the angular accelerations and the value detected by the speed-related value detecting means, and the motor is driven and controlled based on the running state judged by the judging means.

In the electric power steering apparatus of the second aspect, the speed-related value detecting means detects a value relating to the running speed of the vehicle, the judging means judges the running state of the vehicle, based on the relation between the calculated angular velocities or the relation between the calculated angular accelerations and the value detected by the speed-related value detecting means, and the motor is driven and controlled based on the running state judged by the judging means.

Thus, it is possible to realize an electric power steering apparatus capable of judging the running state of a vehicle in greater detail and of driving and controlling the steering force assisting motor, based on the running state judged by the judging means.

An electric power steering apparatus according to the third aspect is based on the second aspect, wherein, when the angular velocity or the angular acceleration is greater on the steering wheel side, the rotational angles are both greater than a predetermined angle, and the value detected by the speed-related value detecting means is smaller than a first relevant value, the judging means judges that the torque is caused by an input from the steering wheel side, and an output of the motor is increased.

In the electric power steering apparatus of the third aspect, when the angular velocity or the angular acceleration is greater on the steering wheel side, the rotational angles are both greater than the predetermined angle, and the value detected by the speed-related value detecting means is smaller than the first relevant value, the judging means judges that the torque was caused by an input from the steering wheel side, and the output of the motor is increased.

Thus, it is possible to realize an electric power steering apparatus capable of increasing the steering assisting force when the steering wheel is in a stationary steering state during parking or running at an extremely low speed.

An electric power steering apparatus according to the fourth aspect is based on the second or third aspect, and further comprises: rolling detecting means for detecting rolling of the vehicle; and integrating means for integrating the detected rotational angles, respectively, when the angular velocities are both greater than a first angular velocity, the value detected by the speed-related value detecting means is greater than a second relevant value greater than the first relevant value and is smaller than a third relevant value greater than the second relevant value, and the rolling detected by the rolling detecting means is greater than a predetermined value, wherein, when the integrated values given by the integrating means are both greater than a predetermined integrated value, the judging means judges that the torque was caused by an input from the steering wheel side, and an output of the motor is increased.

In the electric power steering apparatus of the fourth aspect, the rolling detecting means detects the rolling of the vehicle, and the integrating means integrates the detected rotational angles, respectively, when the angular velocities are both greater than the first angular velocity, the value detected by the speed-related value detecting means is greater than the second relevant value greater than the first relevant value and is smaller than the third relevant value greater than the second relevant value, and the rolling detected by the rolling detecting means is greater than the predetermined value. When the integrated values given by the integrating means are both greater than the predetermined integrated value, the judging means judges that the torque is caused by an input from the steering wheel side, and the output of the motor is increased.

Thus, it is possible to realize an electric power steering apparatus capable of increasing the steering assisting force when a vehicle is driving on a mountainous road.

An electric power steering apparatus according to the fifth aspect is based on the fourth aspect, wherein, when the angular velocity on the steering wheel side is smaller than a second angular velocity which is smaller than the first angular velocity, the angular velocity or the angular acceleration on the steering mechanism side is greater than a corresponding predetermined value, and the value detected by the speed-related value detecting means is greater than the third relevant value, the judging means judges that the torque is caused by an input from the steering mechanism side, and the motor is driven and controlled so as to cancel the torque.

In the electric power steering apparatus of the fifth aspect, when the angular velocity on the steering wheel side is smaller than the second angular velocity smaller than the first angular velocity, the angular velocity or the angular acceleration on the steering mechanism side is greater than a corresponding predetermined value, and the value detected by the speed-related value detecting means is greater than the third relevant value, the judging means judges that the torque was caused by an input from the steering mechanism side, and the steering force assisting motor is driven and controlled so as to cancel the torque.

Thus, it is possible to realize an electric power steering apparatus capable of canceling kick back when the vehicle receives the kick back during high-speed driving, so as to prevent the steering wheel from slipping through the driver's hands.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

First Embodiment

Figure 1:
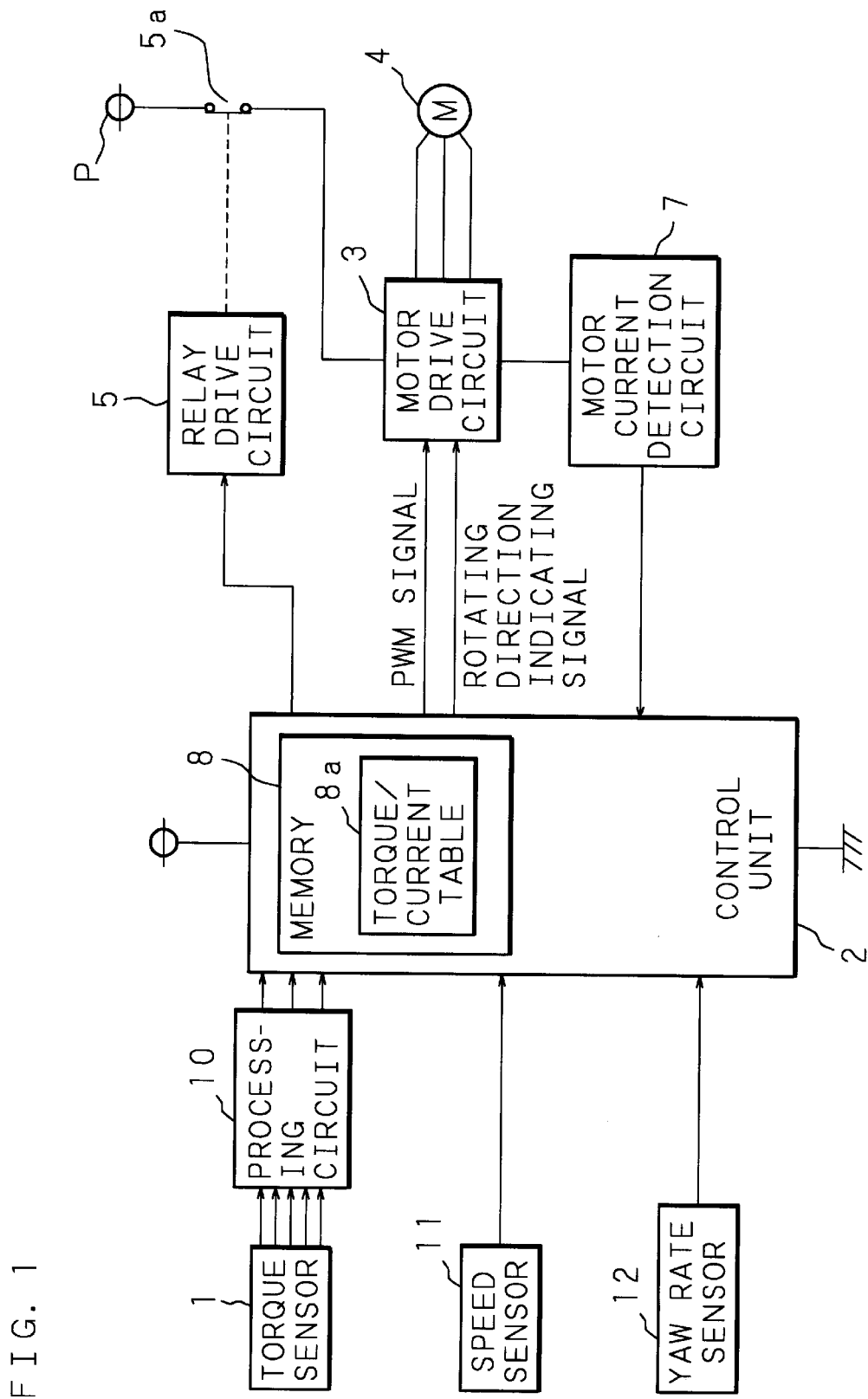
FIG. 1 is a block diagram showing the essential structure of an embodiment of an electric power steering apparatus of the present invention.

FIG. 1 is a block diagram showing the essential structure of an embodiment of an electric power steering apparatus of the present invention. In this electric power steering apparatus, torque detection signals detected and outputted by a torque sensor 1 for detecting torque applied to a steering shaft (not shown) are processed by a processing circuit 10. The resulting torque signals from the processing circuit 10 and absolute steering angle signals on the steering wheel side and on the steering mechanism side (not shown) of the steering shaft are supplied to a control unit 2. Further, a speed signal detected and outputted by a speed sensor 11 for detecting the speed of a vehicle and a yaw rate signal detected by a yaw rate sensor 12 for detecting rolling of the vehicle are supplied to the control unit 2.

A relay control signal outputted from the control unit 2 is inputted to a relay drive circuit 5. The relay drive circuit 5 turns on or off a fail-safe relay contact 5a according to the relay control signal. Based on the torque signals, speed signal, yaw rate signal and later-described motor current signal, the control unit 2 refers to a torque/current table 8a in an onboard memory 8, and thereby produces motor current target values. Note that, the speed signal is not limited to the one mentioned above, and may be a signal indicating a value relating to the speed of the vehicle, for example, the rotation speed of the engine, the rotation speed of the wheel, or the rotation speed of the motor if the vehicle is an electric vehicle.

The control unit 2 supplies the produced motor current target values as a PWM signal and a rotating direction indicating signal to a motor drive circuit 3. The motor drive circuit 3 is supplied with a power supply voltage of an onboard battery P via the fail-safe relay contact 5a, and rotates and drives a steering force assisting motor 4 based on the supplied motor current target values. The motor current flowing in the motor 4 is detected by a motor current detection circuit 7, supplied to the control unit 2 as a motor current signal, and used for feedback control of the motor current.

Figure 2:
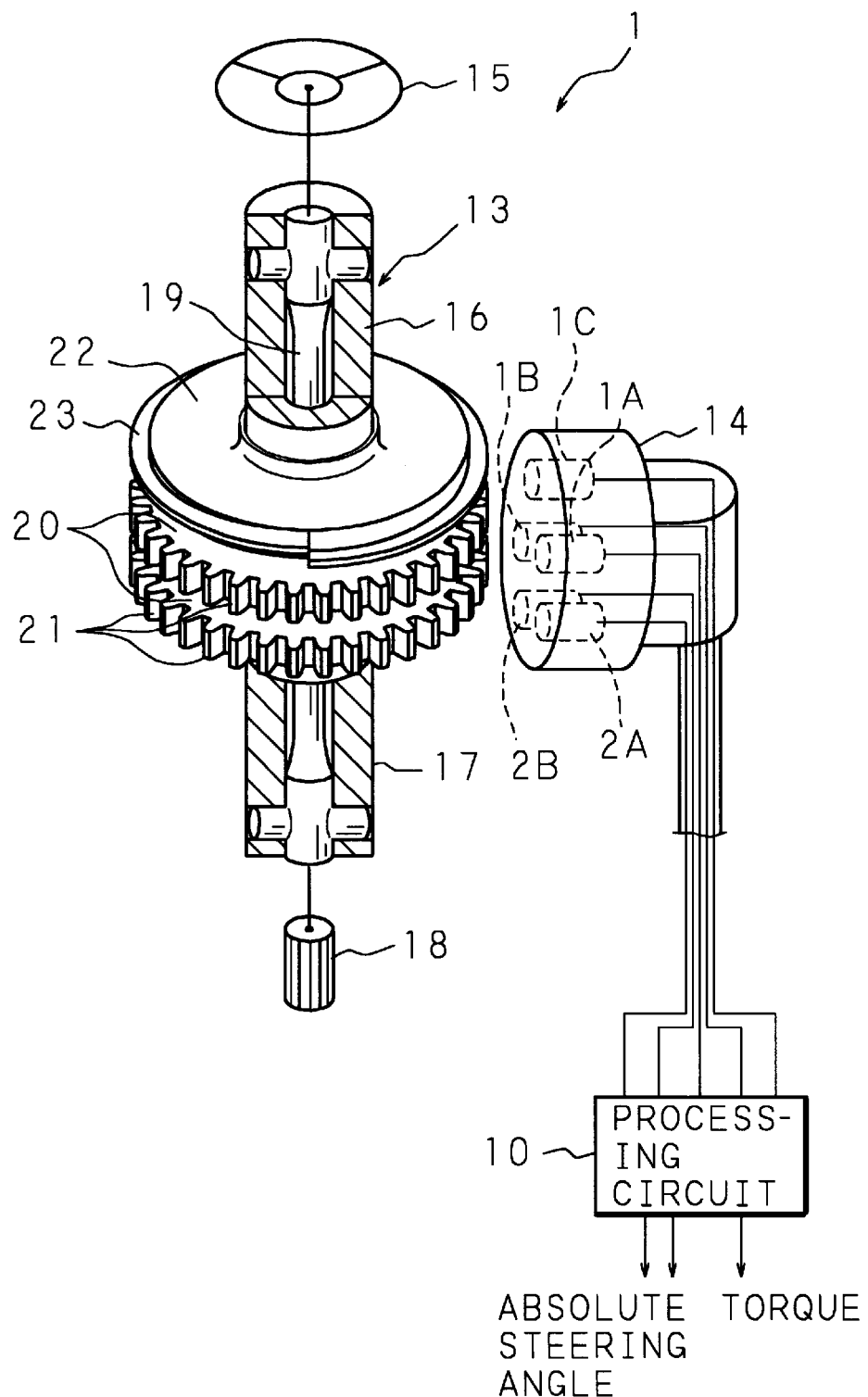
FIG. 2 is a schematic diagram showing an example of the essential structure of a torque sensor.

FIG. 2 is a schematic diagram showing schematically an example of the essential structure of the torque sensor 1. In this torque sensor 1, an input shaft 16 having an upper end connected to a steering wheel 15 and an output shaft 17 having a lower end connected to a pinion 18 of a steering mechanism are coaxially connected through a torsion bar 19 of a small diameter so as to construct a steering shaft 13 for connecting the steering wheel 15 and the steering mechanism, and portions in the vicinity of the connection parts of the input shaft 16 and output shaft 17 are constructed as follows.

On the input shaft 16, a disc-like target plate 20 is coaxially fitted and fixed in the vicinity of an end of the connection part to the output shaft 17, and targets 21, for example, 36 targets, that are magnetic protrusions are provided at equal intervals in the circumferential direction on the outer circumferential surface of the target plate 20. The targets 21 are made of teeth of a spur gear having an involute tooth profile, and a ring-shaped spur gear forms the target plate 20 and the targets 21.

A target plate 20 having targets 21 similar to the above is also fitted and fixed in the vicinity of an end of the connection part of the output shaft 17 to the input shaft 16. The targets 21 of the target plate 20 on the output shaft 17 side and the targets 21 of the target plate 20 on the input shaft 16 side are arranged to align with each other in the circumferential direction. Note that it is also possible that the input shaft 16 and the output shaft 17 are formed using magnetic material and the teeth are formed by gear-cutting the circumferential surfaces of these input shaft 16 and the output shaft 17.

Further, on the input shaft 16, a target plate 22 having approximately the same shape as the target plate 20 is fitted and fixed coaxially on the steering wheel 15 side of the target plate 20, and a target 23 that is a magnetic protrusion is provided in the circumferential direction on the outer circumferential surface of the target plate 22. The target 23 is arranged spirally in one turn on the outer circumferential surface of the target plate 22.

A sensor box 14 is provided outside the target plates 20 and 22 to face the outer edges of the targets 21 and 23 on the outer circumferences of the target plates 20 and 22. The sensor box 14 is fixed and supported to a stable part such as a housing for supporting the input shaft 16 and the output shaft 17. Magnetic sensors 1A, 1B facing different portions in the circumferential direction of the target plate 21 on the input shaft 16 side and magnetic sensors 2A, 2B facing different portions in the circumferential direction of the target plate 21 on the output shaft 17 side are stored in the sensor box 14 so that their positions in the circumferential direction are correctly aligned. Also stored in the sensor box 14 is a magnetic sensor 1C facing a portion of the target 23 of the target plate 22.

The magnetic sensors 1A, 2A, 1B, 2B, 1C are sensors constructed using elements such as magneto-resistance effect elements (MR elements) whose electrical characteristics (resistances) change with the action of magnetic field so that the detection signals vary according to the approaching portions of the facing targets 21 and 23. These detection signals are supplied to the processing circuit 10 composed of a microprocessor, provided outside or inside the sensor box 14.

Figure 3A:
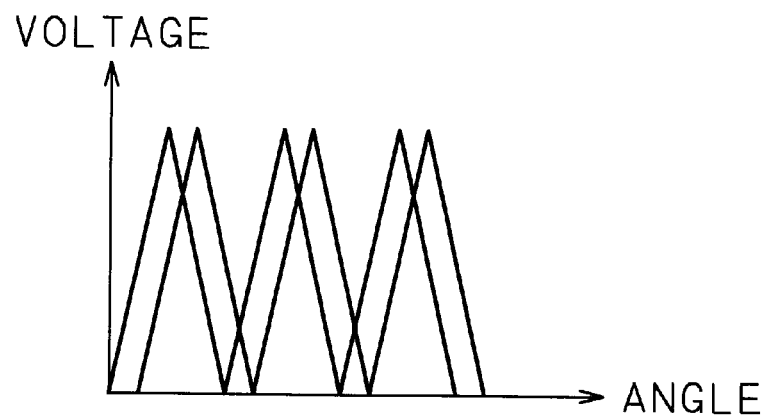
FIGS. 3A–3C are waveform charts showing the detection signals of the magnetic sensors of the torque sensor.
Figure 3B:
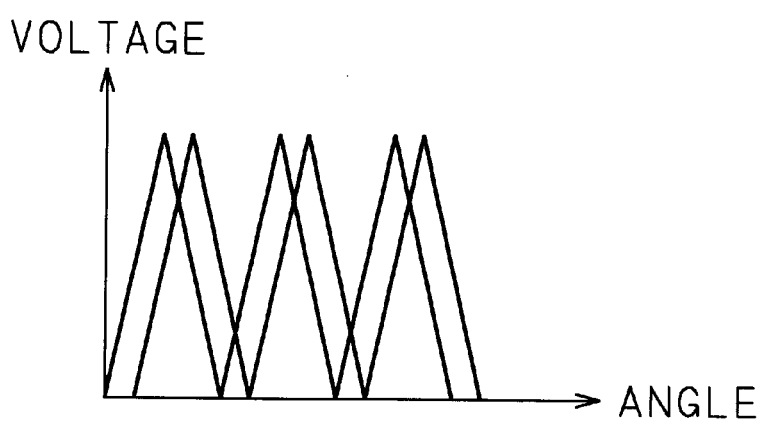
Figure 3C:
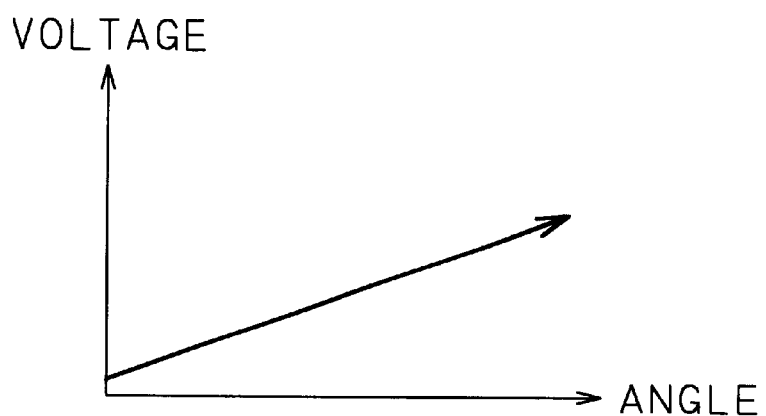

The magnetic sensors 1A, 2A, 1B, 2B output detection signals analogous to a triangular wave or a sine wave as shown in FIGS. 3A and 3B, according to the passage of the respective targets 21. While these detection signals have a maximum non-linear change rate in the vicinity of transition from rise to fall or from fall to rise, they can be compensated by a signal processing method described later. On the other hand, the magnetic sensor 1C outputs a detection signal with a waveform rising or falling in one direction as shown in FIG. 3C, according to the passage of the target 23. One cycle of the detection signal is outputted with one rotation of the target plate 22.

In the torque sensor 1 having such a structure, the magnetic sensors 1A, 1B (2A, 2B) output detection signals which rise and fall according to a change in the rotational angle of the input shaft 16 (output shaft 17) as shown in FIGS. 3A and 3B during a period in which the corresponding targets 21 pass the positions facing the respective sensors.

The detection signals of the magnetic sensors 1A and 1B correspond to the rotational angle of the input shaft 16 having the targets 21 corresponding to the magnetic sensors 1A and 1B, while the detection signals of the magnetic sensors 2A and 2B correspond to the rotational angle of the output shaft 17 having the targets 21 facing the magnetic sensors 2A and 2B. Accordingly, the processing circuit 10 can calculate the relative rotational angle of the input shaft 16 from the detection signals of the magnetic sensors 1A and 1B, and the processing circuit 10 and magnetic sensors 1A and 1B function as a rotational angle detecting apparatus for the input shaft 16. Besides, the processing circuit 10 can calculate the relative rotational angle of the output shaft 17 from the detection signals of the magnetic sensors 2A and 2B.

When torque is applied to the input shaft 16, a difference occurs between a detection signal of the magnetic sensors 1A, 1B and a detection signal of the magnetic sensors 2A, 2B. The magnetic sensors 1A, 2A and the magnetic sensors 1B, 2B have a phase difference of 90° in the electrical angle, for example, in the circumferential direction of the target plates 20. While the detection signals have a maximum non-linear change rate at the maximum value and minimum value that are the transition points to rise or fall, they can be mutually compensated because of the phase difference. Note that the phase difference may be any angle between 1° and 360° in electrical angle when the compensation is possible.

Here, the difference between the detection signal of the magnetic sensor 1A and the detection signal of the magnetic sensor 2A or the difference between the detection signal of the magnetic sensor 1B and the detection signal of the magnetic sensor 2B corresponds to the difference in the relative rotational angles between the input shaft 16 and the output shaft 17 (relative angle displacement). This relative angle displacement corresponds to the torsion angle generated in the torsion bar 19 connecting the input shaft 16 and the output shaft 17, under the action of the torque applied to the input shaft 16. It is therefore possible to calculate the torque applied to the input shaft 16, based on the above-mentioned difference between the detection signals.

Meanwhile, the magnetic sensor 1C outputs a detection signal having a waveform rising or falling in one direction as shown in FIG. 3C. Since the detection signal of one cycle is outputted with one rotation of the target plate 22, it is possible to associate the detection signal with the rotation position of the target plate 22. Accordingly, an absolute steering angle from the steering angle middle point of the steering wheel 15 and input shaft 16 can be calculated from the detection signal of the magnetic sensor 1C, and an absolute steering angle from the steering angle middle point of the output shaft 17 can be easily calculated from the above-mentioned relative angle displacement. Then, the processing circuit 10 outputs the calculated torque signal and the absolute steering angle signals of the input shaft 16 and output shaft 17.

Figure 4:
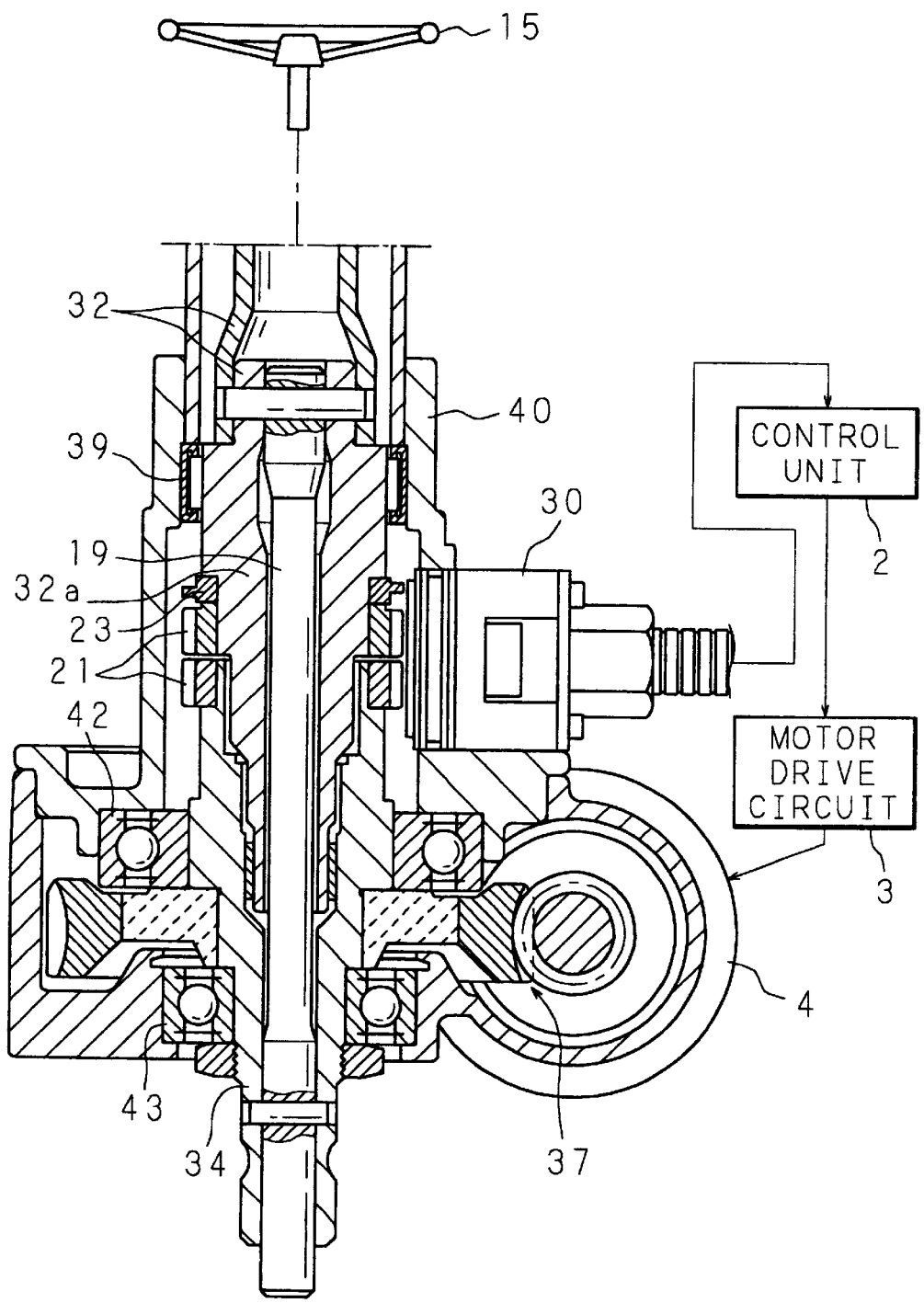
FIG. 4 is a cross sectional view showing the structure of an electric power steering apparatus of the present invention.

FIG. 4 is a cross sectional view showing the structure of an electric power steering apparatus of the present invention. This electric power steering apparatus comprises: an input shaft 32 (16) connected to the steering wheel 15; an output shaft 34 (17) connected coaxially to the input shaft 32 through the torsion bar 19; a sensor 30 for detecting torque applied to the input shaft 32 with a rotation of the steering wheel 15, based on torsion generated on the torsion bar 19; and the steering force assisting motor 4 which is driven by the control unit 2 through the motor drive circuit 3, based on the torque detected by the sensor 30, and transmits the rotation of the motor 4 to the output shaft 34 through a reduction gear mechanism 37 and to the steering mechanism (not shown) via transmission means connected to the output shaft 34.

The input shaft 32 has a cylindrical portion 32a into which one end of the torsion bar 19 is inserted, and the targets (and target plates) 21, 23 fitted and fixed on the outer circumferential surface of the cylindrical portion 32a. One end of the cylindrical portion 32a is rotatably supported inside a housing 40 through a needle bearing 39. The output shaft 34 is designed in a cylindrical shape, and the other end of the cylindrical portion 32a and the other end of the torsion bar 19 are inserted into the output shaft 34. The output shaft 34 has, on one end thereof, the target 21 adjacent to the target 21 on the input shaft 32 side. The middle portion of the output shaft 34 in the axial direction is rotatably supported through ball bearings 42 and 43 inside the housing 40.

Figure 5:
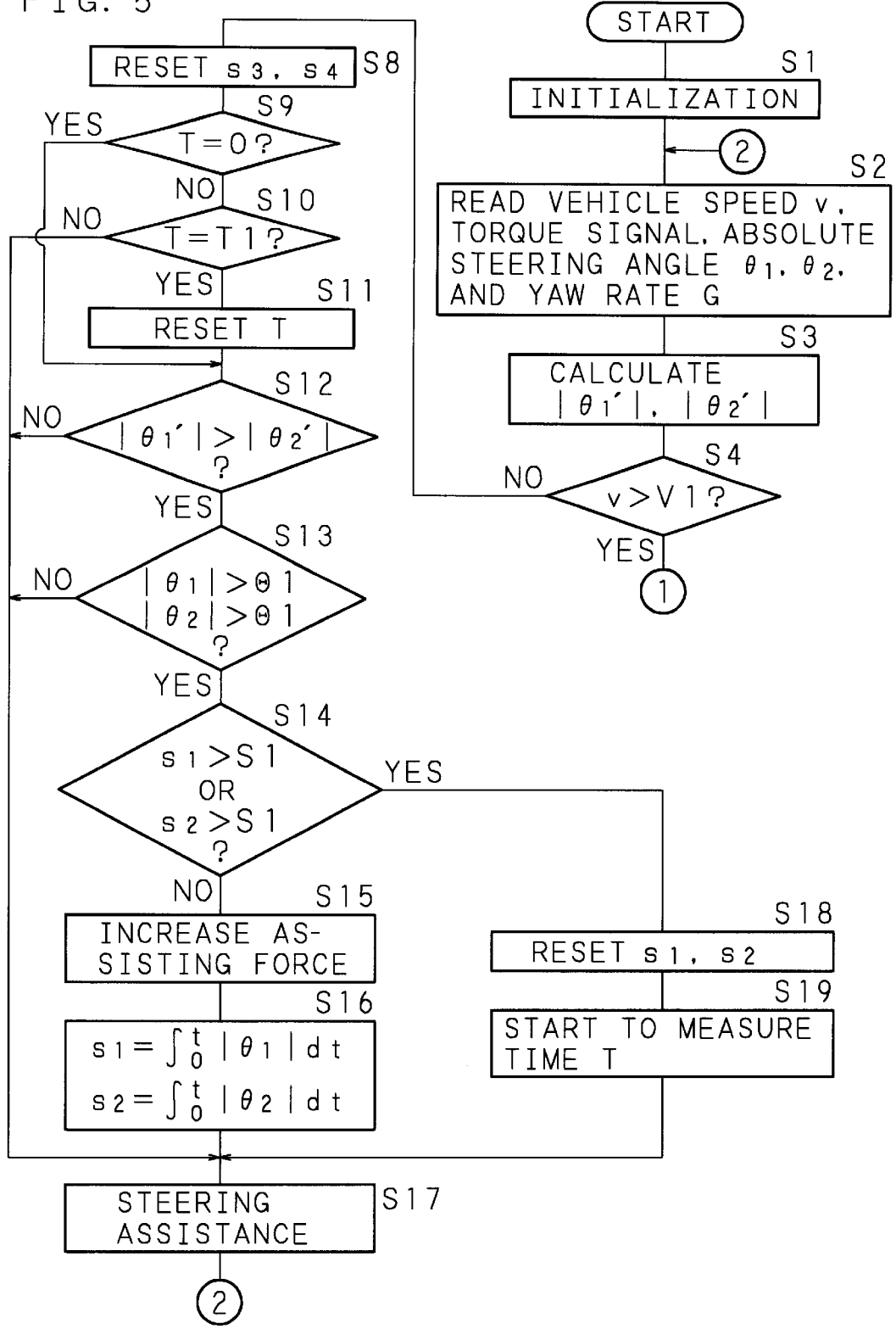
FIG. 5 is a flow chart showing the operations of the electric power steering apparatus of the present invention.
Figure 6:
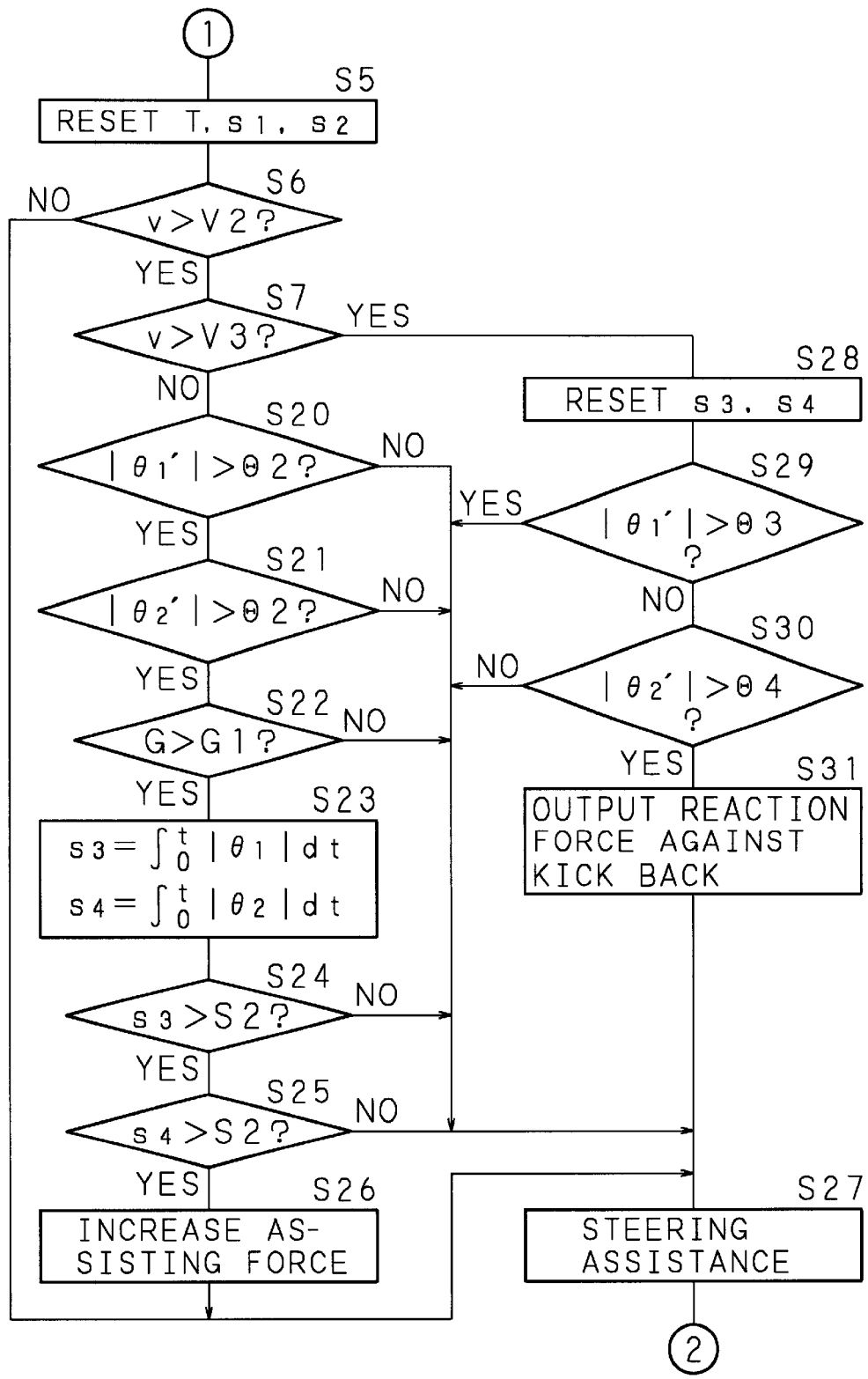
FIG. 6 is a flow chart showing the operations of the electric power steering apparatus of the present invention.

Referring to the flow charts of FIGS. 5 and 6, the following description will explain the operations of the electric power steering apparatus having such a structure.

The control unit 2 first initializes the parameters (S1), and then reads a vehicle speed v from the speed sensor 11, a torque signal from the processing circuit 10, absolute steering angles $\theta_1$, $\theta_2$ of the input shaft 16 and output shaft 17, and a yaw rate G from the yaw rate sensor 12 (S2). Next, the control unit 2 calculates absolute values $|\theta_1'|$, $|\theta_2'|$ of the angular velocities of the input shaft 16 and output shaft 17, based on the absolute steering angles $\theta_1$, $\theta_2$(S3).

Next, the control unit 2 judges whether the vehicle speed v is greater than a predetermined vehicle speed V1 (first relevant value) that is close to zero (S4). When the vehicle speed v is not greater than the predetermined vehicle speed V1, the control unit 2 resets the later-described integrated values $s_3$, $s_4$ (S8), and then judges whether the measured time T is zero or not (S9). When the measured time T is zero (S9), the control unit 2 judges whether the absolute value $|\theta_1'|$ of the angular velocity of the input shaft 16 is greater than the absolute value $|\theta_2'|$ of the angular velocity of the output shaft 17 (S12). When the absolute value $|\theta_1'|$ of the angular velocity of the input shaft 16 is greater, the control unit 2 judges whether the absolute values $|\theta_1|$, $|\theta_2|$ of the rotational angles of the input shaft 16 and output shaft 17 are both greater than a predetermined angle $\Theta 1$ (S13).

When both of the absolute values $|\theta_1|$, $|\theta_2|$ of the rotational angles of the input shaft 16 and output shaft 17 are greater than the predetermined angle $\Theta 1$ (S13), the control unit 2 judges whether at least one of the later-described integrated values $s_1$, $s_2$ is greater than a predetermined integrated value S1 (S14). When neither of the integrated values $s_1$, $s_2$ is greater than the predetermined integrated value S1, the control unit 2 judges that the steering wheel is in a stationary steering state during parking or running at an extremely low speed and increases the steering assisting force (assisting force) (S15). After calculating the integrated values $s_1$, $s_2$ of the absolute values $|\theta_1|$, $|\theta_2|$ of the rotational angles of the input shaft 16 and output shaft 17 (S16), the control unit 2 executes steering assistance (S17), and then performs the next sampling (S2).

If at least one of the integrated values $s_1$, $s_2$ is greater than the predetermined integrated value S1 (S14), the control unit 2 judges that stationary steering has been performed for a long time. Then, after resetting the integrated values $s_1$, $s_2$ (S18), the control unit 2 starts measuring a cooling time T for preventing burning of the motor drive circuit 3 and the motor 4 (S19), executes normal steering assistance (without increasing the assisting force) (S17), and performs the next sampling (S2).

When the measured time T is not zero (S9), the control unit 2 judges that it is a cooling time for preventing burning of the motor drive circuit 3 and motor 4, and judges whether the cooling time T has reached a predetermined cooling time T1 (S10). When the cooling time T has reached the predetermined cooling time T1, the control unit 2 resets the cooling time T (S11), and then judges whether the absolute value $|\theta_1'|$ of the angular velocity of the input shaft 16 is greater than the absolute value $|\theta_2'|$ of the angular velocity of the output shaft 17 (S12).

When the cooling time T has not reached the predetermined cooling time T1 (S10), when the absolute value $|\theta_1'|$ of the angular velocity of the input shaft 16 is not greater than the absolute value $|\theta_2'|$ of the angular velocity of the output shaft 17 (S12), or when neither of the absolute values $|\theta_1|$, $|\theta_2|$ of the angular velocity of the input shaft 16 and output shaft 17 are greater than the predetermined angle $\Theta 1$ (S13), the control unit 2 executes normal steering assistance (without increasing the assisting force) (S17), and performs the next sampling (S2).

When the vehicle speed v is greater than the predetermined vehicle speed V1 that is close to zero (S4), the control unit 2 resets the cooling time T and the integrated values $s_1$, $s_2$ (S5), and then judges whether the vehicle speed v is greater than a predetermined vehicle speed V2 (second relevant value) which is greater than the predetermined vehicle speed V1 (S6). When the vehicle speed v is greater than the predetermined vehicle speed V2, the control unit 2 judges whether the vehicle speed v is greater than a predetermined vehicle speed V3 (third relevant value) which is greater than the predetermined vehicle speed V2 (S7). When the vehicle speed v is not greater than the predetermined vehicle speed V3 (S7), the control unit 2 judges whether the absolute value $|\theta_1'|$ of the angular velocity of the input shaft 16 is greater than a predetermined angular velocity $\Theta 2$ (the first angular velocity) (S20). If it is greater than the predetermined angular velocity $\Theta 2$, the control unit 2 judges whether the absolute value $|\theta_2'|$ of the angular velocity of the output shaft 17 is greater than the predetermined angular velocity $\Theta 2$ (S21).

When the absolute value $|\theta_2'|$ of the angular velocity of the output shaft 17 is greater than the predetermined angular velocity $\Theta 2$ (S21), the control unit 2 judges whether the yaw rate G from the yaw rate sensor 12 is greater than a predetermined value G1 (S22). When the yaw rate G is greater than the predetermined value G1 (S22), the control unit 2 calculates the integrated values $s_3$, $s_4$ of the absolute values $|\theta_1|$, $|\theta_2|$ of the rotational angles of the input shaft 16 and output shaft 17 (S23), and then judges whether the integrated values $s_3$, $s_4$ are both greater than a predetermined integrated value S2 (S24, S25).

When both of the integrated values $s_3$, $s_4$ are greater than the predetermined integrated value S2 (S24, S25), the control unit 2 judges that the vehicle is running on a mountainous road and increases the assisting force (S26), executes steering assistance (S27), and performs the next sampling (S2). When the vehicle speed v is not greater than the predetermined vehicle speed V2 (S6), when the absolute value $|\theta_1'|$ of the angular velocity of the input shaft 16 is not greater than the predetermined angular velocity $\Theta 2$ (S20), when the yaw rate G is not greater than the predetermined value G1 (S22), or when at least one of the integrated values $s_3$, $s_4$ is not greater than the predetermined integrated value S2 (S24, S25), the control unit 2 executes normal steering assistance (without increasing the assisting force) (S27), and performs the next sampling (S2).

When the vehicle speed v is greater than the predetermined vehicle speed V3 (S7), the control unit 2 resets the integrated values $s_3$, $s_4$ (S28), and then judges whether the absolute value $|\theta_1'|$ of the angular velocity of the input shaft 16 is greater than a predetermined angle $\Theta 3$ (the second angular velocity) that is close to zero (S29). If it is not greater than the predetermined angular velocity $\Theta 3$, the control unit 2 judges whether the absolute value $|\theta_2'|$ of the angular velocity of the output shaft 17 is greater than a predetermined angular velocity $\Theta 4$ (predetermined value) (S30). When the absolute value $|\theta_2'|$ of the angular velocity of the output shaft 17 is greater than the predetermined angular velocity $\Theta 4$ (S27), the control unit 2 judges that the vehicle received kick back during high-speed driving and outputs a reaction force against kick back for cancellation of the kick back so as to prevent the steering wheel from slipping through the driver's hands (S31), executes steering assistance (S27), and performs the next sampling (S2).

When the absolute value $|\theta_1'|$ of the angular velocity of the input shaft 16 is greater than the predetermined angular velocity $\Theta3$ that is close to zero (S29), or when the absolute value $|\theta_2'|$ of the angular velocity of the output shaft 17 is not greater than the predetermined angular velocity $\Theta4$ (S30), the control unit 2 executes normal steering assistance (without increasing the assisting force) (S27), and performs the next sampling (S2).

In the above-described embodiment 1, while the absolute value $|\theta_1'|$ of the angular velocity of the input shaft 16 and the absolute value $|\theta_2'|$ of the angular velocity of the output shaft 17 are used, it is also possible to perform the same operations by using an absolute value $|\theta_1''|$ of the angular acceleration of the input shaft 16 and an absolute value $|\theta_2''|$ of the angular acceleration of the output shaft 17 instead of $|\theta_1'|$ and $|\theta_2'|$.

Second Embodiment

Figure 7:
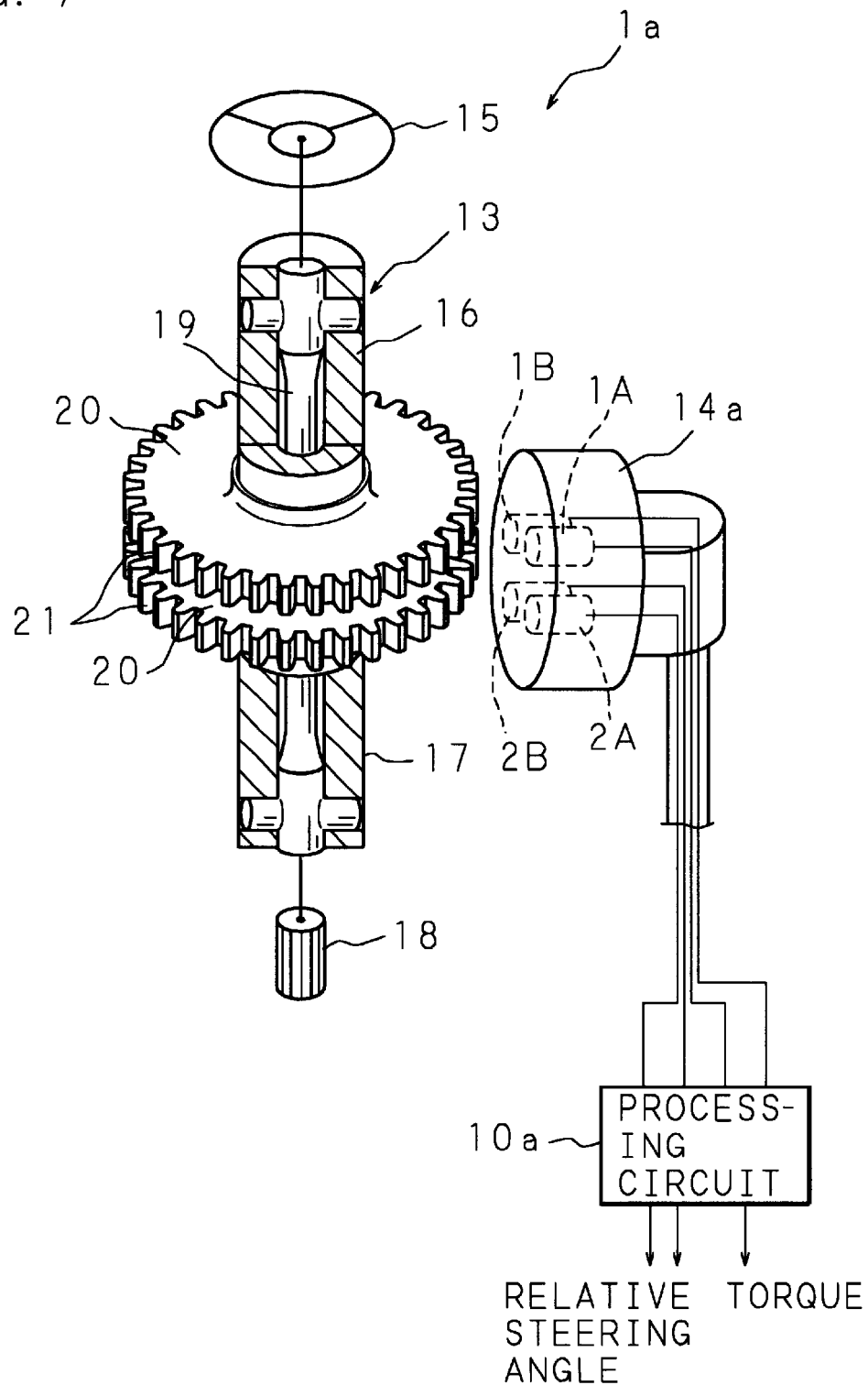
FIG. 7 is a schematic diagram showing an example of the essential structure of a torque sensor.

FIG. 7 is a schematic diagram showing schematically an example of the essential structure of a torque sensor of an electric power steering apparatus of the present invention. This torque sensor 1a is constructed by omitting the target plate 22 and the target 23 from the above-described torque sensor 1 (FIG. 2) and using a sensor box 14a obtained by omitting the magnetic sensor 1C from the sensor box 14, and outputs a torque signal and relative steering angle signals of the input shaft 16 and output shaft 17 from a processing circuit 10a.

A block diagram showing the essential structure of the second embodiment of the electric power steering apparatus is the same as the block diagram (FIG. 1) showing the essential structure of the first embodiment of the electric power steering apparatus of the present invention, except that the torque sensor 1 is replaced by the torque sensor 1a.

Figure 8:
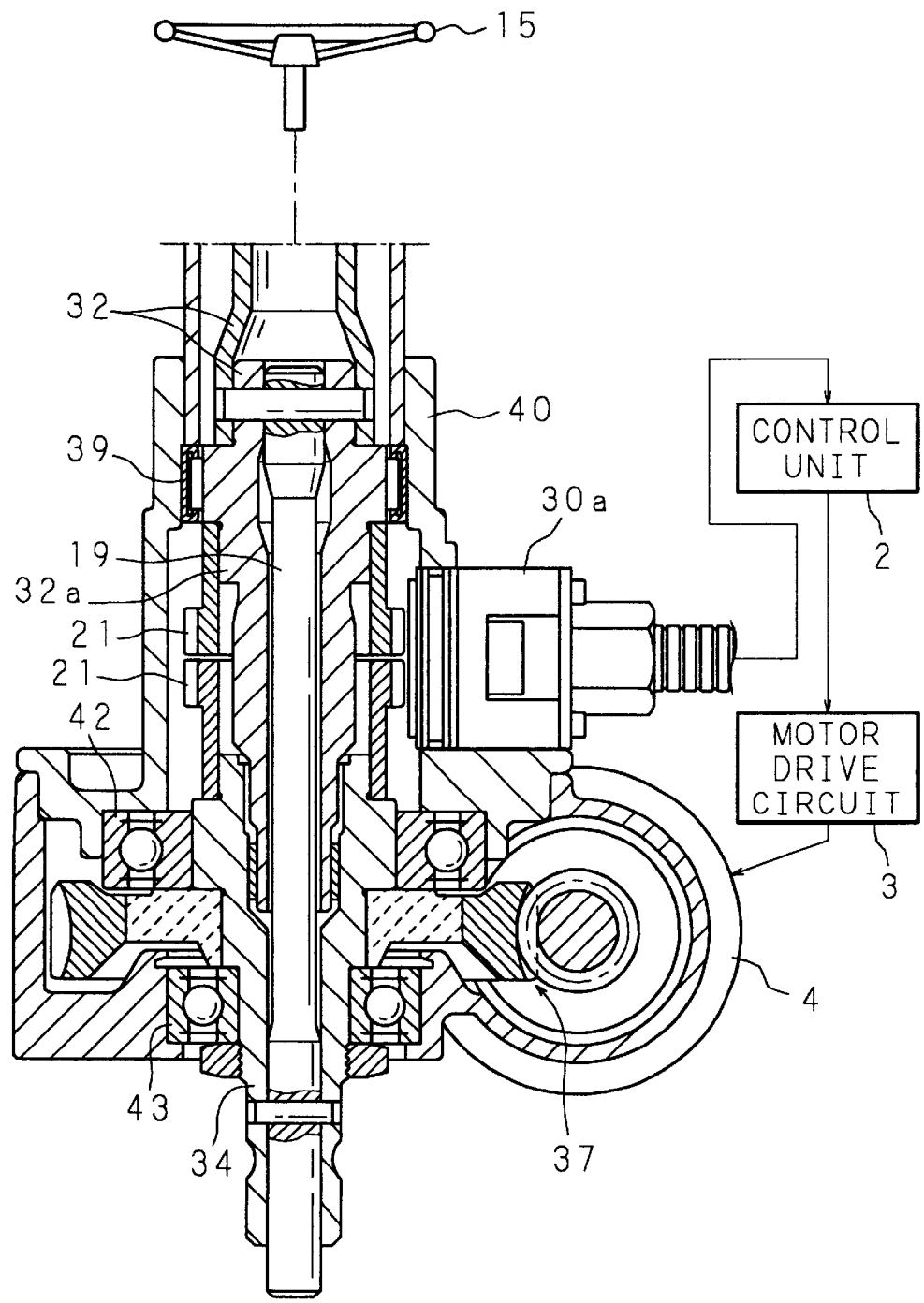
FIG. 8 is a cross sectional view showing the structure of an electric power steering apparatus of the present invention.

FIG. 8 is a cross sectional view showing the structure of an electric power steering apparatus of the present invention. This electric power steering apparatus is constructed by omitting the sensor 30 and the target 23 from the construction of the above-described electric power steering apparatus and comprising a sensor 30a.

In an electric power steering apparatus having such a structure, the control unit 2 stores, as the steering angle middle points, the positions of the input shaft 16 and output shaft 17, for example, when the vehicle has being running for a predetermined period of time or more at a predetermined speed or more in a state causing substantially no phase difference between the input shaft 16 and the output shaft 17, based on the relative steering angle signals of the input shaft 16 and output shaft 17 from the processing circuit 10a, and then calculates the absolute steering angles $\theta_1$, $\theta_2$ of the input shaft 16 and output shaft 17 based on the steering angle middle points. Since the rest of the structure and operations are the same as those of the first embodiment of the electric power steering apparatus of the present invention, the explanation thereof is omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for detecting rotational angles of a steering shaft, which connects a steering wheel of a vehicle and a steering mechanism of wheels, at different positions in an axial direction of said steering shaft, calculating torque applied to said steering shaft, based on a difference between the detected rotational angles, and driving and controlling a steering force assisting motor attached to said steering mechanism so as to apply an assisting force corresponding to a direction and magnitude of the calculated torque to said steering mechanism, comprising:

a calculator for calculating an angular velocity or angular acceleration of said steering shaft at each of the detection positions, based on the detected rotational angles;

a judging device for judging whether the torque was caused by an input from the steering wheel side or an input from the steering mechanism side, based on a relation between the angular velocities or a relation between angular accelerations calculated by said calculator; and a controller for driving and controlling said motor based on a result of judgment by said judging device.

2. The electric power steering apparatus of claim 1, further comprising a speed-related value detector for detecting a value relating to a running speed of the vehicle, wherein said judging device judges a running state of the vehicle based on the relation between the angular velocities or the relation between the angular accelerations and the value detected by said speed-related value detector, and said controller drives and controls said motor based on the running state judged by said judging device.

3. The electric power steering apparatus of claim 2, wherein, when the angular velocity or the angular acceleration is greater on the steering wheel side, the rotational angles are both greater than a predetermined angle, and the value detected by said speed-related value detector is smaller than a first relevant value, said judging device judges that the torque is caused by the input from the steering wheel side, and said controller increases an output of said motor.

4. The electric power steering apparatus of claim 2, further comprising:

a rolling detector for detecting rolling of the vehicle; and an integrator for integrating the detected rotational angles, respectively, when the angular velocities are both greater than a first angular velocity, the value detected by said speed-related value detector is greater than a second relevant value greater than the first relevant value and is smaller than a third relevant value greater than the second relevant value, and the rolling detected by said rolling detector is greater than a predetermined value, wherein, when the integrated values given by said integrator are both greater than a predetermined integrated value, said judging device judges that the torque is caused by the input from the steering wheel side, and said controller increases an output of said motor.

5. The electric power steering apparatus of claim 3, further comprising:

a rolling detector for detecting rolling of the vehicle; and an integrator for integrating the detected rotational angles, respectively, when the angular velocities are both greater than a first angular velocity, the value detected by said speed-related value detector is greater than a second relevant value greater than the first relevant value and is smaller than a third relevant value greater than the second relevant value, and the rolling detected by said rolling detector is greater than a predetermined value, wherein, when the integrated values given by said integrator are both greater than a predetermined integrated value, said judging device judges that the torque is caused by the input from the steering wheel side, and said controller increases the output of said motor.

6. The electric power steering apparatus of claim 4,
wherein, when the angular velocity on the steering wheel side is smaller than a second angular velocity which is smaller than the first angular velocity, the angular velocity or the angular acceleration on the steering mechanism side is greater than a corresponding predetermined value, and the value detected by said speed-related value detector is greater than the third relevant value, said judging device judges that the torque is caused by the input from the steering mechanism side, and said controller drives and controls said motor so as to cancel the torque.

7. The electric power steering apparatus of claim 5,
wherein, when the angular velocity on the steering wheel side is smaller than a second angular velocity which is smaller than the first angular velocity, the angular velocity or the angular acceleration on the steering mechanism side is greater than a corresponding predetermined value, and the value detected by said speed-related value detector is greater than the third relevant value, said judging device judges that the torque is caused by the input from the steering mechanism side, and said controller drives and controls said motor so as to cancel the torque.

* * * * *